Figure 1:
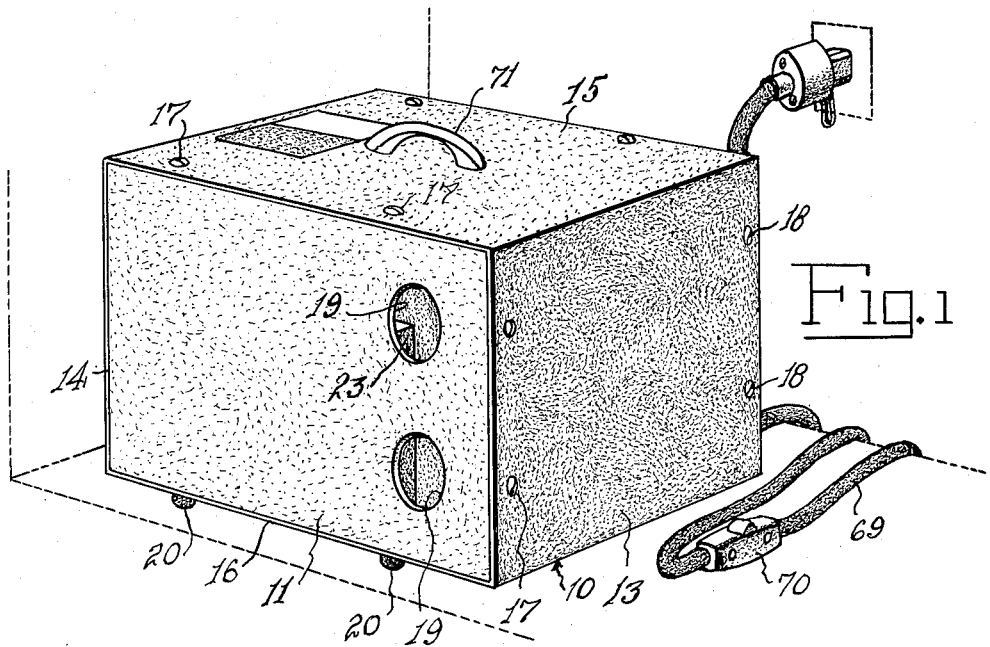

April 9, 1963  J. C. MORRIS  3,085,001
ELECTRONIC FUME AND ODOR INCINERATOR
Filed Nov. 18, 1960  3 Sheets-Sheet 1

INVENTOR
Joel C. Morris

BY Jacobi & Jacobi
ATTORNEYS

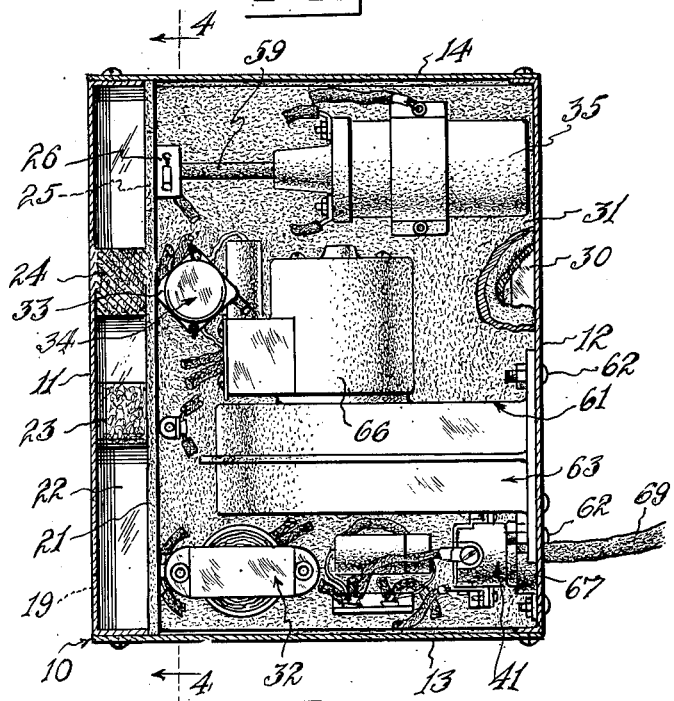
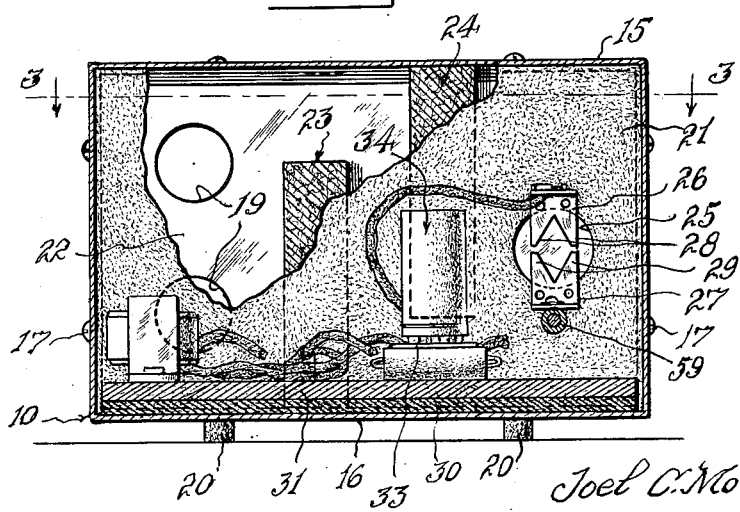

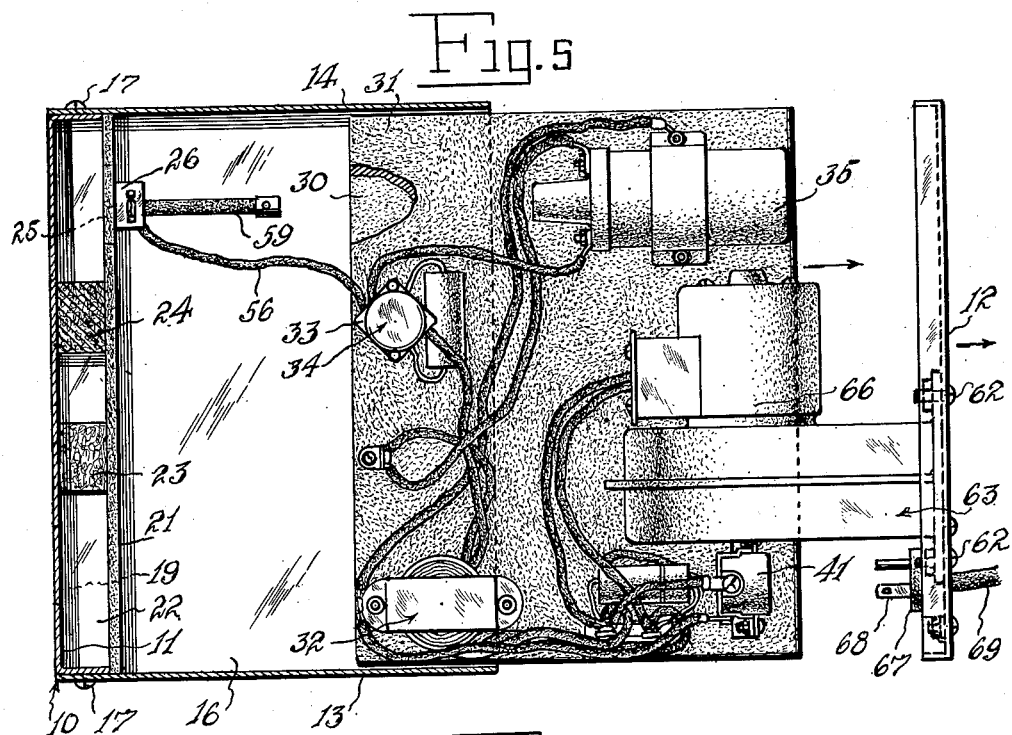
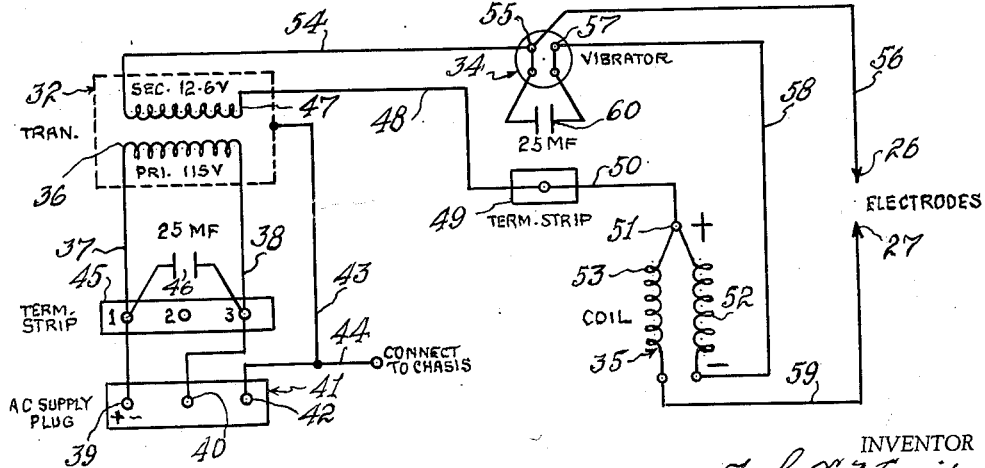

United States Patent Office 3,085,001
Patented Apr. 9, 1963

3,085,001
ELECTRONIC FUME AND ODOR INCINERATOR
Joel C. Morris, 2819 Broadway NE., Knoxville 17, Tenn.
Filed Nov. 18, 1960, Ser. No. 70,186
3 Claims. (Cl. 23—277)

This invention relates to air purification or treatment and more particularly to an electronic fume and odor incinerator which operates to remove obnoxious fumes and odors from the air and a more or less enclosed space.

Many attempts have been made to provide a suitable apparatus or method for deodorizing purposes in the home, hospital rooms or other sick rooms, restaurants or other eating places or the like, and some of these prior attempts have involved the dissipation of a material in the atmosphere having a pleasant odor which serves to override the obnoxious odor and thereby improve conditions. However, this method of deodorization provides only a relatively short relief from obnoxious odors and the treatment must be repeated frequently in order to be at all satisfactory and such method has been found to be completely unsatisfactory in the case of extremely penetrating odors or odors of high intensity and furthermore, the cost of such a method of treatment has been relatively high.

Ventilation of the area has, of course, been one method of solving this problem, but this requires a relatively large ventilating fan or other means for removing air from a particular space and also this method involves the provision of considerable additional heat in the colder months in order to replace the warm air removed from the space and in the warmer months, particularly in the case of air conditioned enclosures, air conditioning equipment of larger capacity is required in order to adequately cool the increased volume of air resulting from ventilation of the space by fresh air. Also unless the volume of air removed from the space is relatively large, this method is not adequate to overcome a great many obnoxious fumes and odors.

Of late attempts have been made to provide suitable electronic equipment for eliminating obnoxious fumes and odors from an enclosed space and while the more costly permanent installations usually incorporated with heating or air conditioning systems have proved relatively satisfactory with the exception of the necessity of frequent cleaning of the equipment, small portable units which may be conveniently moved from room to room have, in the main, utilized ozone as a deodorizing agent and while these units which generate ozone have been satisfactory to a certain extent, nevertheless, they are not usually in locations where a person allergic to ozone is situated and consequently, this type of unit is not universally applicable.

It would accordingly appear that the provision of a relatively low cost portable apparatus which serves to adequately remove or eliminate obnoxious fumes or odors from the atmosphere in a room which is quiet in operation generates no radio or television interference and is usable in the presence of all persons, regardless of any particular allergy from which a particular person may suffer represents a very worthwhile step forward in the art.

It is accordingly an object of the invention to provide an electronic fume and odor incinerator which is of relatively small size and weight thereby contributing to portability and facilitating use of the device in any desired location.

A further object of the invention is the provision of an electronic fume and odor incinerator which serves to eliminate or remove all obnoxious fumes and odors thereof.

A still further object of the invention is the provision of an electronic fume and odor incinerator which is entirely portable and self-contained and requires only attachment to a standard electrical outlet to provide for complete and satisfactory operation thereof.

Another object of the invention is the provision of an electronic fume and odor incinerator in which air from the space to be deodorized is circulated over an electric spark which serve to incinerate the fumes and odors thereafter discharging the purified and deodorized air to the space in which the device is located.

A further object of the invention is the provision of an electronic fume and odor incinerator in which means is provided to eliminate radial and television interference.

A still further object of the invention is the provision of an electronic fume and odor incinerator in which of an electronic fume and odor incinerator in which means is provided for maintaining noise emanating therefrom at a minimum.

Another object of the invention is the provision of an electronic fume and odor incinerator in which the generation and output of ozone is negligible thereby avoiding adverse effects on persons allergic to ozone.

A further object of the invention is the provision of an electronic fume and odor incinerator which may be completely enclosed in a relatively small, attractive housing and in which all parts are conveniently accessible for repair or replacement by removing one wall of the housing.

A still further object of the invention is the provision of an electronic fume and odor incinerator which may be conveniently and economically manufactured from readily available material and which by the nature of the design will provide relatively long life thereby maintaining cost and maintenance at a minimum.

Figure 2:
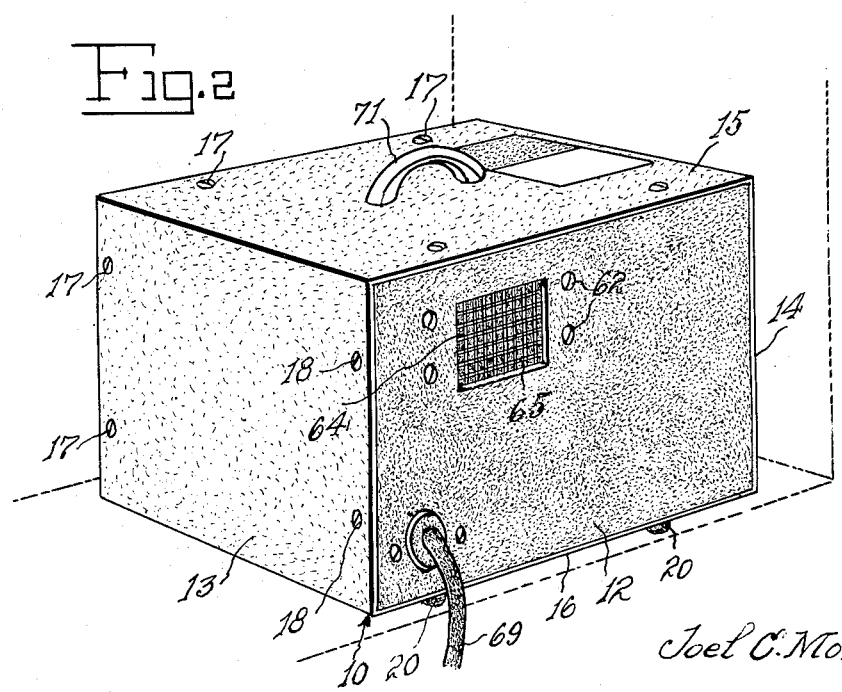

Further objects and advantages of the invention will be apparent from the following description taken in conjunction with the accompanying drawings wherein:

FIG. 1 is a front view in perspective showing an electronic fume and odor incinerator constructed in accordance with this invention;

FIG. 2 a rear view in perspective of the device shown in FIG. 1;

FIG. 3 a sectional view taken substantially on the line 3—3 of FIG. 4 and showing the arrangement of components within the housing of the device;

FIG. 4 a sectional view taken substantially on the line 4—4 of FIG. 3 and with parts broken away and in section for greater clarity and further showing the internal arrangement of the device;

FIG. 5 a sectional view similar to FIG. 3, but portions of the device partially removed from the housing in order to illustrate the accessibility and ease of maintenance of the device; and FIG. 6 a schematic diagram showing the electrical circuit utilized in the electronic incinerator of this invention.

With continued reference to the drawing, there is shown an electronic fume and odor incinerator constructed in accordance with this invention and which may well comprise a closed generally rectangular housing 10 having front and rear walls 11 and 12, sidewalls 13 and 14, a top wall 15 and a bottom wall 10. The front wall 11 may be secured in place by suitable screw threaded fastening means 17 and the rear wall 12 secured in place by suitable screw threaded fastening means 18, such fastening means engaging the side, top and bottom walls. The front wall 11 is provided adjacent one end with vertically spaced air inlet openings 19. The housing 10 may be supported on suitable yieldable feet 20 secured to the bottom wall 16.

A partition 21 is mounted within the housing 10 in spaced relation to the front wall 11 and the space between the partition 21 and the front wall 11 provides an air passage 22. Disposed within the air passage 22 is a baffle 23 extending upwardly from the bottom wall 16 and in spaced relation to the baffle 23 there is provided a second baffle 24 extending downwardly from the top wall 15. The baffle 23 terminates below the top wall 15 and the baffle 24 terminates above the top wall 15 thereby providing a serpentine path for air flowing through the passage 22 from the inlet openings 19. The baffles 23 and 24 may be formed of sound absorbing or insulating material and the purpose of such baffles will later appear. The partition 21 is provided with an aperture 25 therein adjacent the end opposite the inlet openings 19 and during operation of the device, air flows through the inlet openings 19 into the air passage 22 and around the baffles 23 and 24 to pass through the aperture 25 into the interior of the housing 10. A pair of electrodes 26 and 27 are secured to the partition 21 in any suitable manner and electrode 26 is provided with points 28 disposed opposite points 29 on electrode 27 to provide spark gaps disposed substantially in the center of the aperture 25.

A yieldable pad 30 of sponge rubber or the like is disposed within the housing 10 and rests on the bottom wall 16 and supported on the pad 30 is a flat base member 31 which provides a mounting board for the components for the electrical circuit about to be described. The electrical circuit includes a step-down transformer 32, a socket 33 for receiving the prongs of a vibrator 34 and a spark coil 35. The transformer 32, socket 33 and coil 35 are mounted on the base 31 in any suitable manner.

With particular reference to FIG. 6, there is shown a schematic wiring diagram of the power supply involving the above mentioned components and as will be seen, the primary winding 36 of the step-down transformer 32 is connected through conductors 37 and 38 to the terminals 39 and 40 of a power receptacle 41 which is adapted to receive electrical power from a conventional power circuit in a manner to be presently described. The receptacle 41 also includes a ground terminal 42 which may be connected through conductor 43 with the housing of the transformer 32 and through a conductor 44 with the housing of the coil 35 and also to the housing 10 in order to ground such housing 10 and eliminate any shock hazard. For convenience of assembly, a terminal strip 45 may be secured to the base 31 and connected across terminals of the strip 45 between the conductors 37 and 38 is a suitable condenser 46 which contributes to elimination of radial interference.

The secondary winding 47 of the transformer 32 is connected through a conductor 48 to a terminal strip 49 secured to the base 31 and through a conductor 50 to one input terminal 51 of the coil 35. As shown in FIG. 6, the terminal 51 is connected to both the primary and secondary windings 52 and 53 respectively of the coil 35. The opposite side of the secondary winding 47 of the transformer 32 is connected through a conductor 54 to one terminal 55 of the vibrator 34 and this terminal is also connected through a conductor 56 with the electrode 26. The other terminal 57 of the vibrator 34 is connected through a conductor 58 with the opposite end of the primary winding 52 of the coil 35. The output side of the secondary winding 53 of the coil 35 is connected through a conductor 59 with the electrode 27. In order to further contribute to the reduction of radio interference, a suitable condenser 60 may be connected across the points of the vibrator 34.

In the operation of the power supply above described, energization of the transformer 32 serves to deliver electric current to the vibrator 34 to actuate the same resulting in supplying a rapidly interrupted current to the primary winding 52 of the coil 35. This serves to induce a high voltage output in the secondary winding 53, the frequency of which is determined by the frequency of vibration of the vibrator 34. Consequently, an electric arc is provided between the points 28 and 29 of the electrodes 26 and 27 and while the spacing between such points may be varied to suit particular applications, it has been found that the preferred spacing resulting in the least production of ozone is approximately one-eighth of an inch. The frequency of the electric arc also contributes to the generation or production of ozone and consequently, the vibrator is adjusted or provided to afford a frequency of the electric arc which will produce or generate the least possible amount of ozone. It has been found that the ozone generated by the arc of this invention is substantially negligible and is not in any way a factor in the operation of the device insofar as affecting persons allergic to ozone. With the components of the power supply mounted on the base 31 it is only necessary to remove the rear wall 12 of the housing 10 and remove the base 31 to provide full accessibility to the power supply to facilitate repair or maintenance thereof.

A blower 61 is mounted on the rear wall 12 by screw threaded or other suitable fastening means 62 and the blower 61 is provided with a discharge duct 63 communicating with an air discharge opening 64 in the rear wall 12. The discharge opening 64 may, if desired, be covered with a suitable screen or other air pervious means 65. A motor 66 is provided for driving the blower 63, the inlet of which, not shown, communicates with the interior of the housing 10 and the motor 66 may be connected to the power supply receptacle 41 by suitable conductors.

In order to eliminate any shock hazard while servicing or repairing the power supply or blower motor 66, there may be provided on the rear wall 12 a power supply plug 67 having prongs 68 for engaging contacts in the receptacle 41 in such a manner that upon removal of the rear wall 12 from the housing 10 the prongs 68 will disengage from the contacts of the receptacle 41 thereby disconnecting the source of electrical power from the power supply circuit and blower motor 66 mounted within the housing 10. The plug 67 may be connected to a suitable power supply conductor 69 provided with a control switch 70 for convenient starting and stopping of the device.

In operating the electronic fume and odor incinerator of this invention, it is only necessary to place the device in a location where obnoxious fumes or odors exist and for convenience of transportation of the device, there may be provided a carrying handle 71 secured to the top wall 15. Upon operating the switch 70 to supply electrical power to the device the blower motor 66 will be energized to draw air from the surrounding atmosphere through the inlet openings 19, the air passage 22 and through the aperture 25 in the partition 21. At the same time, the coil 35 will be energized to provide an electric arc between the points of the electrodes 26 and 27 and the air passing through the aperture 25 in the partition 21 will be subjected to the action of the electric arc. This electric arc operates to incinerate or burn the obnoxious fumes and odors in the air passing through the aperture 25 and the purified and deodorized air passes through the housing 10 and into the inlet of the blower 61 and out to the atmosphere surrounding the unit through the discharge opening 64 in the rear wall 12. The yieldable pad 30 absorbs vibration from the vibrator 34 while the baffles 23 and 24 in the air passage 22 serve to muffle the noise created by the electric arc and consequently, the device is extremely quiet in operation.

The blower is of the squirrel cage variety and consequently moves at a relatively high volume of air at low velocity thereby maintaining noise from this source at a minimum and any vibration transmitted to the housing 10 from the blower motor 66 or from any other source is absorbed in the yieldable feet 20. Consequently, the device of this invention can be operated in a relatively small room without disturbing a person or persons therein by reason of noise emanating from the apparatus.

It will be seen that by the above described invention there has been provided a relatively simple electronic fume and odor incinerator and it has been found by extensive tests that this device is highly effective in eliminating cooking or other kitchen odors, tobacco smoke or sick room odors and since the ozone output of the device is negligible there is no danger of adversely affecting persons allergic to ozone and furthermore, the noise emanating from the device is at such a low level that the same is barely perceptible.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. An electronic fume and odor incinerator comprising a closed generally rectangular housing, one wall of said housing having air inlet openings therein adjacent one end, a partition in said housing spaced from said one wall to provide an air passage, said partition having an aperture therein adjacent the end opposite said inlet openings, spaced sound muffling baffles in said passage between said inlet openings and said aperture, a pair of electrodes secured to said partition and providing a spark gap in the path of air flowing through said aperture, a base received in said housing and supported on a yieldable pad, a high voltage power supply for said electrodes, said power supply comprising a step-down transformer connected to a conventional power line, a spark coil having a primary and secondary winding, means connecting the output of said secondary winding to one of said electrodes, a vibrator, means connecting one side of the output of said transformer to the other electrode and through said vibrator to one side of said primary winding, means connecting the other side of said output of said transformer to the other side of said primary winding, a condenser connected across the points of said vibrator and a condenser connected across the input to said transformer to reduce radio interference, said transformer, vibrator and coil being mounted on said base, another wall of said housing having an air discharge opening, a motor driven blower mounted on said other wall with the outlet of said blower communicating with said discharge opening and the intake communicating with the interior of said housing and means connecting said blower motor to said power line, whereby the arc across said electrodes will be at a frequency determined by the frequency of operation of said vibrator and fumes or odors entrained in air passing through said aperture will be incinerated by said arc, the purified odorless air being discharged through said discharge opening.

2. An electronic fume and odor incinerator comprising a closed generally rectangular housing, one wall of said housing having air inlet openings therein adjacent one end, a partition in said housing spaced from one wall to provide an air passage, said partition having an aperture therein adjacent the opposite inlet openings, a pair of electrodes providing a spark gap in the path of air flowing through said aperture, a base received in said housing and supported on a yieldable pad, a high voltage power supply for said electrodes, said power supply comprising a step-down transformer connected to a conventional power line, a spark coil having a primary and secondary winding, means connecting the output of said secondary winding to one of said electrodes, a vibrator, means connecting one side of the output of said transformer to the other electrode and through said vibrator to one side of said primary winding, means connecting the other side of the output of said transformer to the other side of said primary winding, a condenser connected across the points of said vibrator and a condenser connected across the input to said transformer to reduce radio interference, said transformer, vibrator and coil being mounted on said base, another wall of said housing having an air discharge opening therein, a motor driven blower mounted on said other wall at the outlet of said blower communicating with said discharge opening and the intake communicating with the interior of said housing and means connecting said blower motor to said power line, whereby the arc across said electrodes will be at a frequency determined by the frequency of operation of said vibrator and fumes or odors entrained in air passing through said aperture will be incinerated by said arc, the purified odorless air being discharged through said discharge opening.

3. An electronic fume and odor incinerator comprising a closed generally rectangular housing, one wall of said housing having air inlet openings therein adjacent one end, a partition in said housing spaced from one wall to provide an air passage, said partition having an aperture therein adjacent the end opposite inlet openings, a pair of electrodes providing a spark gap in the path of air flowing through said aperture, a high voltage power supply for said electrodes, said power supply comprising a step-down transformer connected to a conventional power line, a spark coil having a primary and secondary winding, means connecting the output of said secondary winding to one of said electrodes, a vibrator, means connecting one side of the output of said transformer to the other electrode and through said vibrator to one side of said primary winding, means connecting the other side of the output of said transformer to the other side of said primary winding, a condenser connecting across the points of said vibrator and a condenser connected across the input of said transformer to reduce radio interference, another wall of said housing having an air discharge opening therein, a motor driven blower mounted on said other wall with the outlet of said blower communicating with said discharge opening and the intake communicating with the interior of said housing and means connecting said blower motor to said power line, whereby the arc across said electrodes will be at a frequency determined by the frequency of operation of said vibrator and fumes or odors entrained in air passing through said aperture will be incinerated by said arc, the purified odorless air being discharged through said discharge opening.

References Cited in the file of this patent

UNITED STATES PATENTS

| | | |
|---|---|---|
| 1,605,484 | Thompson et al. | Nov. 2, 1926 |
| 2,728,408 | Deliman | Dec. 27, 1955 |
| 2,778,441 | Herriott | Jan. 22, 1957 |
| 2,806,346 | Clayton | Sept. 17, 1957 |